(12) United States Patent
Kim

(10) Patent No.: US 11,997,983 B2
(45) Date of Patent: Jun. 4, 2024

(54) STORAGE APPARATUS FOR COMPANION ANIMAL

(71) Applicant: Hyun Jeong Kim, Goyang-si (KR)

(72) Inventor: Hyun Jeong Kim, Goyang-si (KR)

( * ) Notice: Subject to any disclaimer, the term of this patent is extended or adjusted under 35 U.S.C. 154(b) by 764 days.

(21) Appl. No.: 17/047,238

(22) PCT Filed: Oct. 23, 2018

(86) PCT No.: PCT/KR2018/012538
§ 371 (c)(1),
(2) Date: Oct. 13, 2020

(87) PCT Pub. No.: WO2019/198894
PCT Pub. Date: Oct. 17, 2019

(65) Prior Publication Data
US 2021/0161097 A1      Jun. 3, 2021

(30) Foreign Application Priority Data

Apr. 13, 2018   (KR) .................. 10-2018-0043402

(51) Int. Cl.
*A01K 1/02*      (2006.01)
*A01K 1/03*      (2006.01)
*A01K 1/035*     (2006.01)

(52) U.S. Cl.
CPC .......... *A01K 1/0236* (2013.01); *A01K 1/0353* (2013.01)

(58) Field of Classification Search
CPC .. A01K 1/0254; A01K 1/0236; A01K 1/0272; A01K 1/0281; A01K 1/029; A01K 1/035; A01K 1/0353

USPC ......................................................... 119/453
See application file for complete search history.

(56) References Cited

U.S. PATENT DOCUMENTS

| | | | | |
|---|---|---|---|---|
| RE25,826 | E  * | 8/1965 | Ward ................... | A45C 7/0063 190/110 |
| 3,989,008 | A  * | 11/1976 | Neumann ............ | A01K 1/0353 119/482 |
| 3,994,372 | A  * | 11/1976 | Geller ..................... | A45C 3/00 383/18 |

(Continued)

FOREIGN PATENT DOCUMENTS

| | | |
|---|---|---|
| JP | 2014-239726 A | 12/2014 |
| KR | 20-2009-0002650 U | 3/2009 |

(Continued)

OTHER PUBLICATIONS

International Search Report for PCT/KR2018/012538 dated Feb. 19, 2019.

(Continued)

*Primary Examiner* — Yvonne R Abbott-Lewis
(74) *Attorney, Agent, or Firm* — Schmeiser, Olsen & Watts, LLP

(57) ABSTRACT

Provide is a storage apparatus for a companion animal, including a first storage part in which a companion animal is seated, a second storage part connected to an edge of the first storage part and configured to surround the companion animal, and a third storage part coupled to the second storage part, wherein the third storage part surrounds the first storage part or is turned over to cover an upper side of the second storage part, thereby allowing the companion animal to be stored in the storage apparatus having a house or bag form.

20 Claims, 19 Drawing Sheets

1

(56) References Cited

U.S. PATENT DOCUMENTS

| | | | |
|---|---|---|---|
| D367,359 S * | 2/1996 | Smith | D3/273 |
| 9,596,826 B2 * | 3/2017 | Lu | A01K 1/0035 |
| 10,743,515 B2 * | 8/2020 | Lu | A45C 11/00 |
| 11,013,212 B2 * | 5/2021 | Komatsubara | A01K 1/0353 |
| D955,663 S * | 6/2022 | Zhang | D30/109 |
| 2004/0177814 A1 * | 9/2004 | Godshaw | A01K 1/0353 |
| | | | 119/28.5 |
| 2008/0072837 A1 * | 3/2008 | Redzisz | A01K 1/0254 |
| | | | 119/474 |
| 2011/0197822 A1 | 8/2011 | Chou | |

FOREIGN PATENT DOCUMENTS

| | | |
|---|---|---|
| KR | 20-0463068 Y1 | 10/2012 |
| KR | 20-0483999 Y1 | 7/2017 |
| KR | 2017-0111506 A | 10/2017 |

OTHER PUBLICATIONS

Written Opinion Report for PCT/KR2018/012538 dated Feb. 19, 2019.

* cited by examiner

STORAGE APPARATUS FOR COMPANION ANIMAL

CROSS-REFERENCE TO RELATED APPLICATIONS

This application claims priority to PCT Application No. PCT/KR2018/012538, having a filing date of Oct. 23, 2018, based on KR 10-2018-0043402, having a filing date of Apr. 13, 2018, the entire contents both of which are hereby incorporated by reference.

FIELD OF TECHNOLOGY

The following relates to a storage apparatus for a companion animal, and more specifically, to a storage apparatus for a companion animal that is used indoors as a house in which a companion animal lives and that is used outdoors as a bag for moving the companion animal.

BACKGROUND

In general, households raising companion animals are gradually increasing along with various social changes such as aging, low birth rate, and an increase in single-person households. According to press releases of major domestic media, in the early 2010s, the number of domestic populations raising companion animals exceeded 10 million.

The companion animal provides emotional comfort and psychological stability to its owner, that is, forms a companionship for mutual interaction with its owner, and serves to perform a proper function to modern people who are tired due to stress. In this respect, the companion animal is recognized as a family member, and thus the importance and status of the companion animal is gradually rising in recent years.

As the companion animals become family members, various assistive devices such as houses, bags, cushions, and mats for protecting the companion animals and providing convenience to the companion animals are being released in response to the demands to raise the companion animals in healthy ways. In addition, as the outings with the companion animals become more frequent, companion animal bags are gradually being developed into forms that are convenient to carry.

However, since indoor houses and outdoor bags for companion animals are conventionally distinguished, there is a problem of storing the bags in a storehouse. In addition, when going out, there is a problem in that the companion animal does not like to enter an unfamiliar bag and is psychologically unstable. Accordingly, there is a need to improve this.

The background art of embodiments of the present invention is disclosed in Korean Patent Publication No. 2017-0111506 (Published on Oct. 12, 2017, Title of Invention: MOVING BAG FOR COMPANION ANIMAL).

Embodiments of the present invention are directed to providing a storage apparatus for a companion animal which is used indoors as a house in which a companion animal lives and used outdoors as a bag for moving the companion animal.

One aspect of embodiments of the present invention provides a storage apparatus for a companion animal, the storage apparatus including a first storage part in which a companion animal is seated, a second storage part connected to an edge of the first storage part and configured to surround the companion animal, and a third storage part coupled to the second storage part, wherein the third storage part surrounds the first storage part or is turned over to cover an upper side of the second storage part.

The first storage part may include a first storage body part and a first storage access part formed in the first storage body part and configured to open the first storage body part to allow the companion animal to enter or exit therethrough.

The first storage access part may include an access door part separated from the first storage body part by cutting a portion of the first storage body part, and an access-detachment and attachment part which connects or separates the access door part to or from the first storage body part.

The first storage part may further include a first storage expansion part formed in the first storage body part to expand a space.

The first storage expansion part may include an expansion-door part separated from the first storage body part by cutting a portion of the first storage body part, an expansion-detachment and attachment part connecting or separating the expansion-door part to or from the first storage body part, and an expansion-mesh part which connects the expansion-door part and the first storage body part and is folded or unfolded.

The first storage part may further include a first storage exposure part formed in the first storage body part and exposing an interior of the first storage body part.

The first storage exposure part may include an exposure-mesh part formed in the first storage body part and having a mesh shape, and an exposure-opening and closing part formed in the first storage body part to open or close the exposure-mesh part.

The first storage part may further include a first storage coupling part formed on the first storage body part, and a first storage frame part rotatably installed in the first storage coupling part and configured to support the first storage body part or the third storage part covering the upper side of the second storage part.

The second storage part may include a second storage protrusion part protruding upward from the edge of the first storage part and having an upper end portion connected to the third storage part.

The second storage part may further include an additional second storage protrusion part extending upward from the second storage protrusion part.

The third storage part may include a pair of third storage cover parts coupled to the second storage part and facing each other, and a third storage coupling part which couples or separates the pair of third storage cover parts.

The third storage part may further include a third storage opening and closing part formed in the third storage cover part to open or close the third storage cover part.

The third storage part may further include one or more third storage ventilation parts which are formed in the third storage cover part and through which air passes.

The third storage part may further include a third storage installation part formed on the third storage cover part and installed on a wheel type bag handle.

The storage apparatus may further include a fourth storage part formed in one or more of the second storage part and the third storage part and allowing an interior to be visually recognized.

The fourth storage part may include a fourth storage hole part formed in the second storage part and the third storage part.

The fourth storage part may further include one or more fourth storage female fixing parts formed on the second storage part and disposed around the fourth storage hole part, one or more fourth storage male fixing parts formed on the third storage part and disposed around the fourth storage hole part to be coupled to the fourth storage female fixing parts, and a fourth storage cover part coupled to the third storage part, having a mesh shape to be accommodated in the third storage part, and coupled to the fourth storage female fixing part to cover the fourth storage hole part.

The storage apparatus may further include a fifth storage part formed on one or more of the second storage part and the third storage part and allowing a user to carry and move the storage apparatus.

The storage apparatus may further include a sixth storage part inserted into one or more of the second storage part and the third storage part to maintain stiffness thereof.

The storage apparatus may further include a seventh storage part coupled to any one of the first storage part to the third storage part and a collar of the companion animal.

The storage apparatus may further include an eighth storage part covering the first storage part and the second storage part.

In a storage apparatus for a companion animal according to embodiments of the present invention, when a third storage part surrounds a first storage part, the storage apparatus can have a house form, and when the third storage part covers a second storage part, the storage apparatus can have a bag form to store a companion animal.

The companion animal can enter and exit the storage apparatus for a companion animal according to embodiments of the present invention through a first storage access part.

In the storage apparatus for a companion animal according to embodiments of the present invention, an inner space of a bag can be expanded through a first storage expansion part.

The companion animal in the bag of the storage apparatus for a companion animal according to embodiments of the present invention can be visually recognized through a first storage exposure part.

A user can carry and move the storage apparatus for a companion animal according to embodiments of the present invention through using a fifth storage part.

When the storage apparatus for a companion animal according to embodiments of the present invention is in a house or bag state, a sixth storage part can be inserted into one or more of the second storage part and the third storage part to support a weight of the companion animal.

In the storage apparatus for a companion animal according to embodiments of the present invention, an eighth storage part can cover the first storage part and the second storage part to restrict contamination of the first storage part, second storage part, and the third storage part.

BRIEF DESCRIPTION

Some of the embodiments will be described in detail, with reference to the following figures, wherein like designations denote like members, wherein.

DETAILED DESCRIPTION

Figure 1:
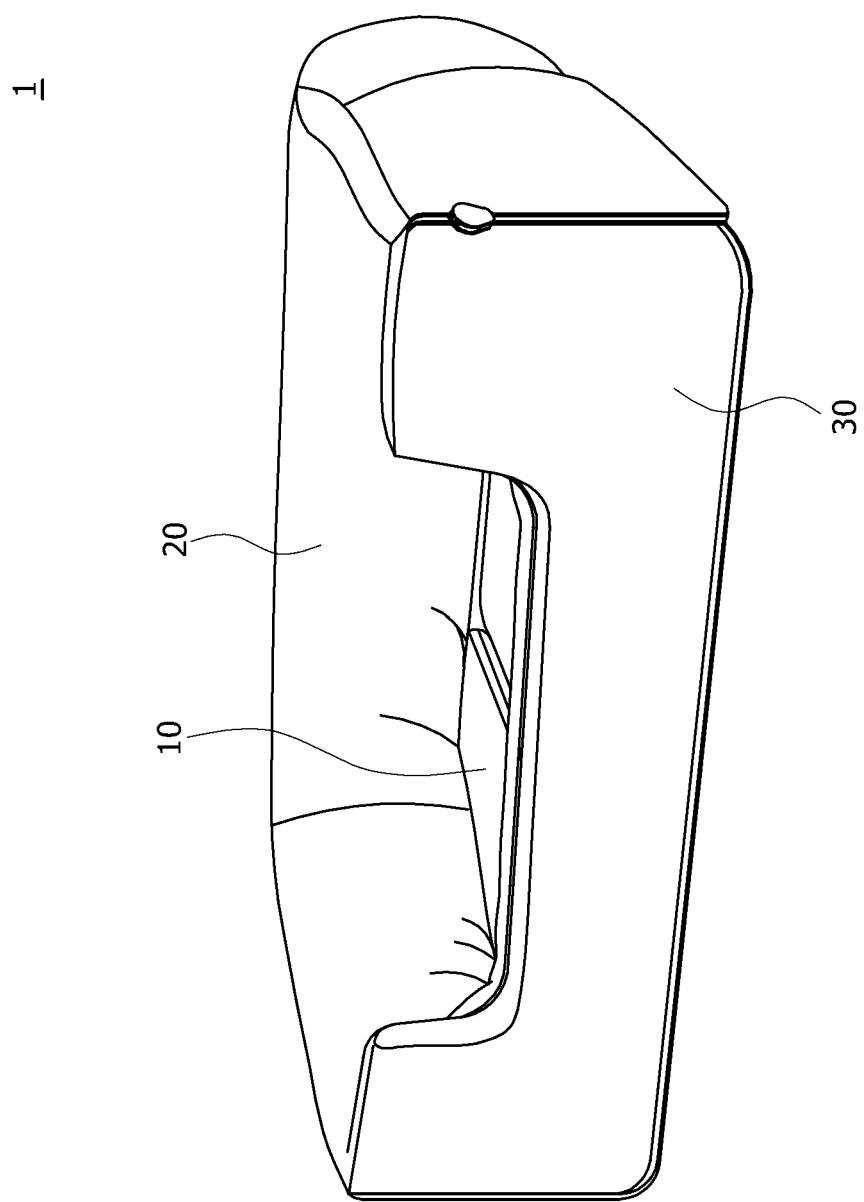
FIG. 1 is a schematic view illustrating a state in which a storage apparatus for a companion animal according to one embodiment of the present invention is used indoors as a house.

Hereinafter, a storage apparatus for a companion animal according to one embodiment of the present invention will be described in detail with reference to the accompanying drawings. Sizes of components or thicknesses of lines in the drawings may be exaggerated for clarity and convenience of explanation. In addition, some terms described below are defined in consideration of functions in embodiments of the invention, and meanings may vary depending on, for example, a user or operator's intentions or customs. Therefore, the meanings of terms should be interpreted based on the scope throughout this specification.

Figure 2:
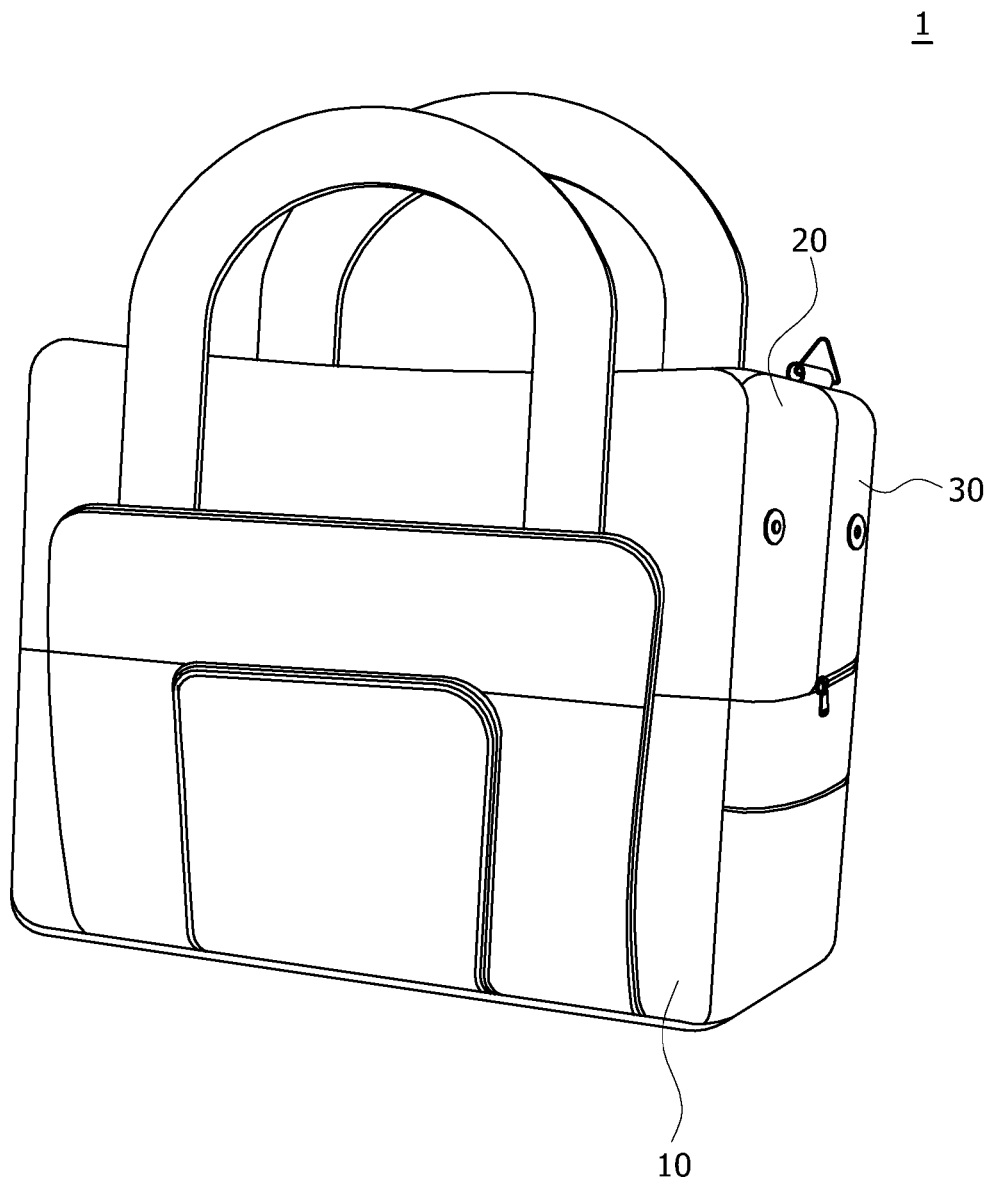
FIG. 2 is a schematic view illustrating a state in which the storage apparatus for a companion animal according to one embodiment of the present invention is used as a bag.

FIG. 1 is a schematic view illustrating a state in which a storage apparatus for a companion animal according to one embodiment of the present invention is used indoors as a house, and FIG. 2 is a schematic view illustrating a state in which the storage apparatus for a companion animal according to one embodiment of the present invention is used as a bag. Referring to FIGS. 1 and 2, a storage apparatus 1 for a companion animal according to one embodiment of the present invention includes a first storage part 10, a second storage part 20, and a third storage part 30. The first, second, and third storage parts 10, 20, and 30 may be formed of a fabric, and a deformable material may be adopted therefor.

A companion animal may be seated inside the first storage part 10. As an example, the first storage part 10 may have a square cushion shape so that the companion animal may sit and rest thereon. In addition, any one of variable shapes may be adopted for the first storage part 10 so that the companion animal may sit thereon. An inner skin of the first storage part 10 may be come into contact with the companion animal.

The second storage part 20 is connected to an edge of the first storage part 10 and surrounds the companion animal. As an example, the second storage part 20 may be disposed to surround the edge of the first storage part 10 and perform a fence function of surrounding the companion animal.

The third storage part 30 is coupled to the second storage part 20. As an example, one end portion of the third storage part 30 may be coupled to the second storage part 20, and the third storage part 30 may be turned over so that both surfaces thereof are usable. More specifically, the third storage part 30 may surround an outer skin of the second storage part 20 and an outer skin of the first storage part 10. In addition, the third storage part 30 may be turned over to cover an upper side of the second storage part 20 and close inner spaces between the first to third storage parts 10, 20, and 30.

In a state in which the third storage part 30 surrounds the first storage part 10 and the second storage part 20, a house allowing the companion animal to rest in the space between the first storage part 10 and the second storage part 20 may be formed. In addition, when the third storage part 30 is turned over to cover the upper side of the second storage part 20, the first, second, and third storage parts 10, 20, and 30 may become a bag form to move the companion animal.

Figure 3:
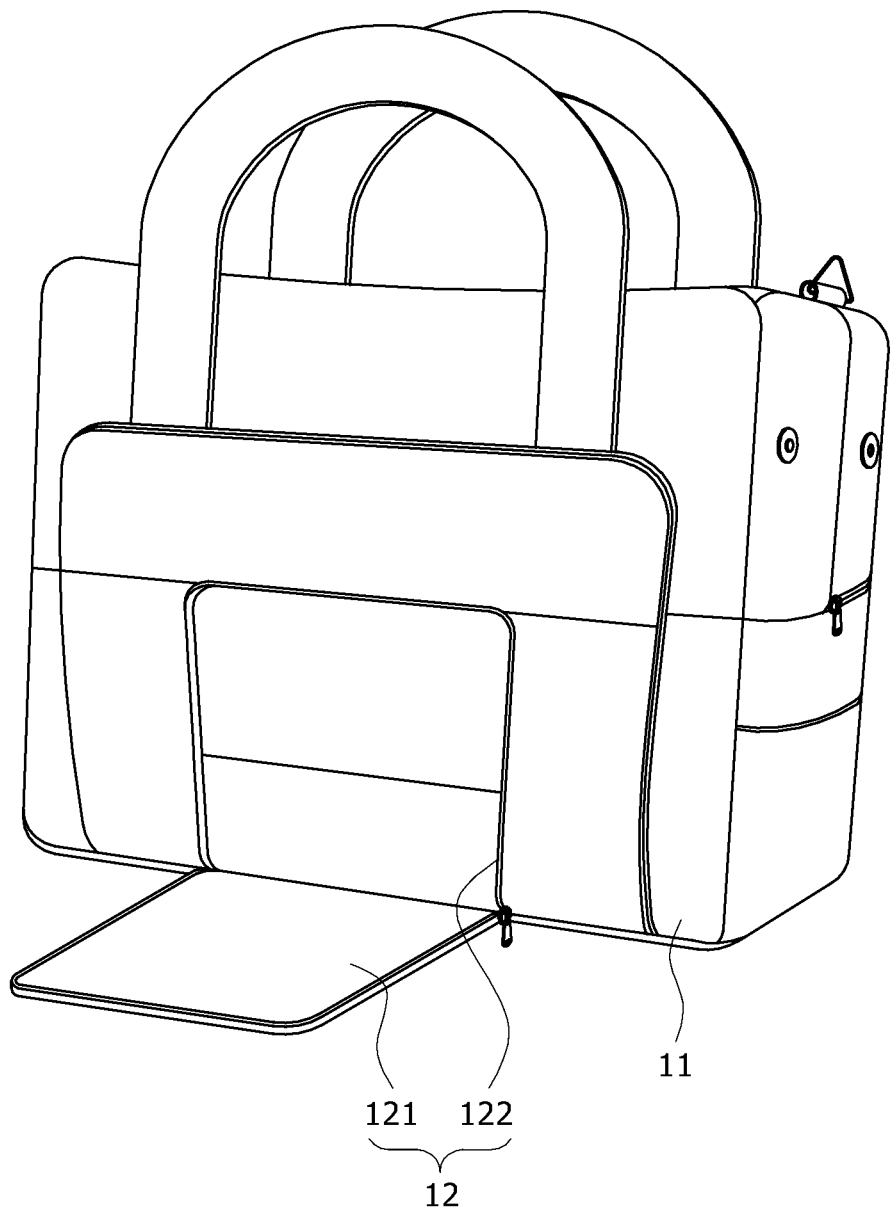
FIG. 3 is a schematic view illustrating a state in which a first storage access part of the storage apparatus for a companion animal according to one embodiment of the present invention is opened.

FIG. 3 is a schematic view illustrating a state in which a first storage access part of the storage apparatus for a companion animal according to one embodiment of the present invention is opened. Referring to FIG. 3, the first storage part 10 according to one embodiment of the present invention includes a first storage body part 11 and a first storage access part 12.

When the storage apparatus 1 is in a house state, the first storage body part 11 may be a bottom surface allowing the companion animal to sit and rest thereon. In addition, when the storage apparatus 1 is in a bag state, the first storage body part 11 may be a side surface which covers the companion animal.

The first storage access part 12 is formed in the first storage body part 11. The first storage access part 12 opens the first storage body part 11 to allow the companion animal to enter or exit the first storage body part 11. That is, when the storage apparatus 1 is in the bag state, the first storage access part 12 may open the first storage body part 11 to allow the companion animal to be put into the bag.

The first storage access part 12 according to one embodiment of the present invention includes an access door part 121 and an access-detachment and attachment part 122.

A portion of the first storage body part 11 is cut so that the access door part 121 is separated from the first storage body part 11. As an example, three sides of the access door part 121 may be separated from the first storage body part 11 through a process of cutting the first storage body part 11.

The access-detachment and attachment part 122 connects or separates the access door part 121 to or from the first storage body part 11. As an example, the access door part 121 and the first storage body part 11 may be connected to or separated from each other by a zipper.

Figure 4:
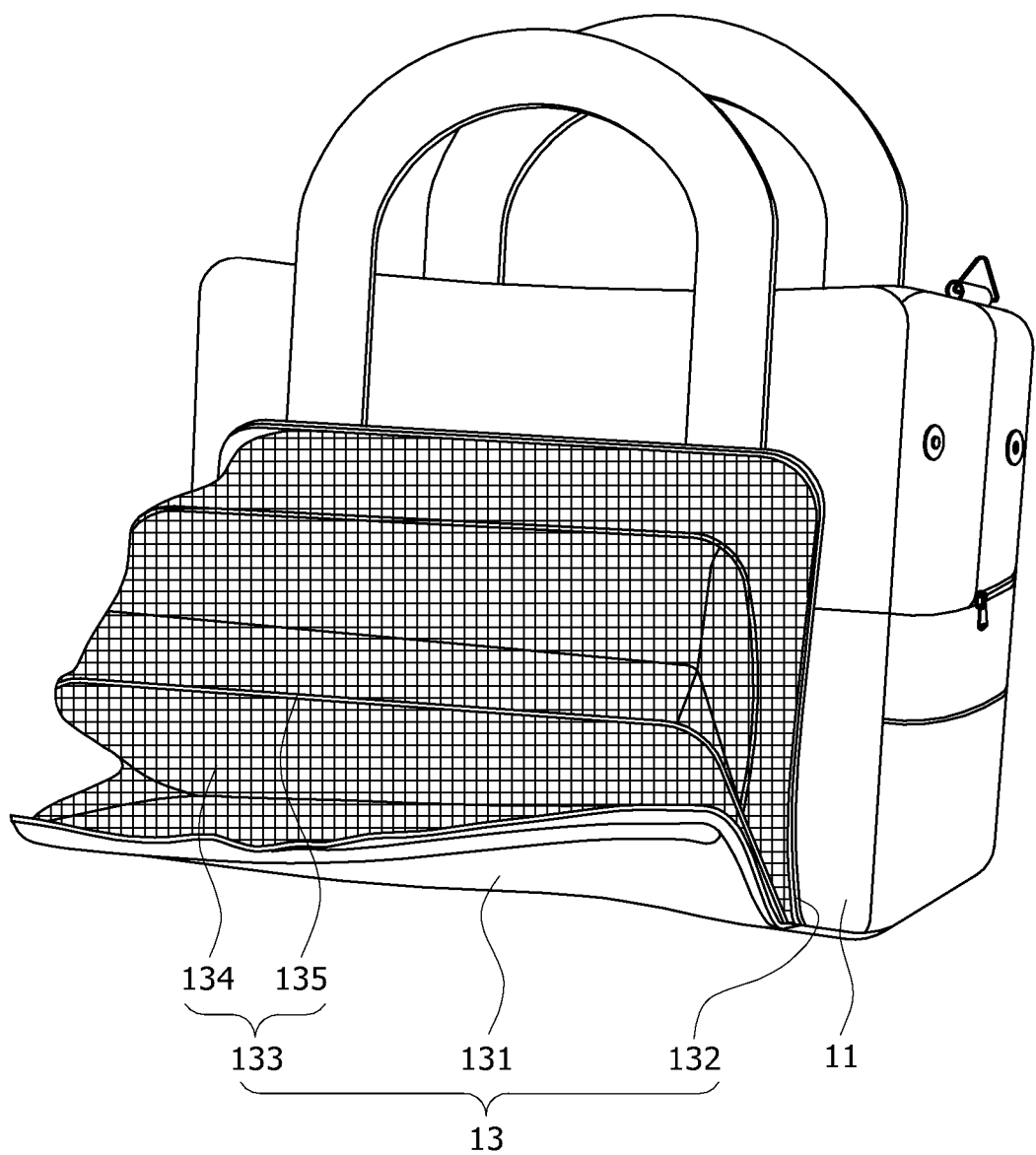
FIG. 4 is a schematic view illustrating a state in which a first storage expansion part of the storage apparatus for a companion animal according to one embodiment of the present invention has an expanded space.

FIG. 4 is a schematic view illustrating a state in which a first storage expansion part expands a space of the storage apparatus for a companion animal according to one embodiment of the present invention. Referring to FIG. 4, since a first storage expansion part 13 according to one embodiment of the present invention is formed in the first storage body part 11 and a space thereof is expandable, the first storage expansion part 13 may provide an additional space to the companion animal who feels stuffy in the bag.

The first storage expansion part 13 according to one embodiment of the present invention includes an expansion-door part 131, an expansion-detachment and attachment part 132, and an expansion-mesh part 133.

A portion of the first storage body part 11 is cut so that the expansion-door part 131 is separated from the first storage body part 11. As an example, three sides of the expansion-door part 131 may be separated from the first storage body part 11 through a process of cutting the first storage body part 11. In this case, the access door part 121 may be formed in the expansion-door part 131 (see FIG. 3).

The expansion-detachment and attachment part 132 connects or separates the expansion-door part 131 to or from the first storage body part 11. As an example, the expansion-door part 131 and the first storage body part 11 may be connected to or separated from each other by a zipper.

The expansion-mesh part 133 connects the expansion-door part 131 and the first storage body part 11 and is folded or unfolded. The expansion-mesh part 133 may fill a gap between the expansion-door part 131 and the first storage body part 11 to allow a space to be expanded by a distance between the first storage body part 11 and the expansion-door part 131. As an example, the expansion-mesh part 133 may include an expansion-mesh connection part 134 having a mesh shape and connecting the first storage body part 11 and the expansion-door part 131, and one or more expansion-mesh frame parts 135 coupled to the expansion-mesh connection part 134 to allow the expansion-mesh connection part 134 to be folded or unfolded.

Figure 5:
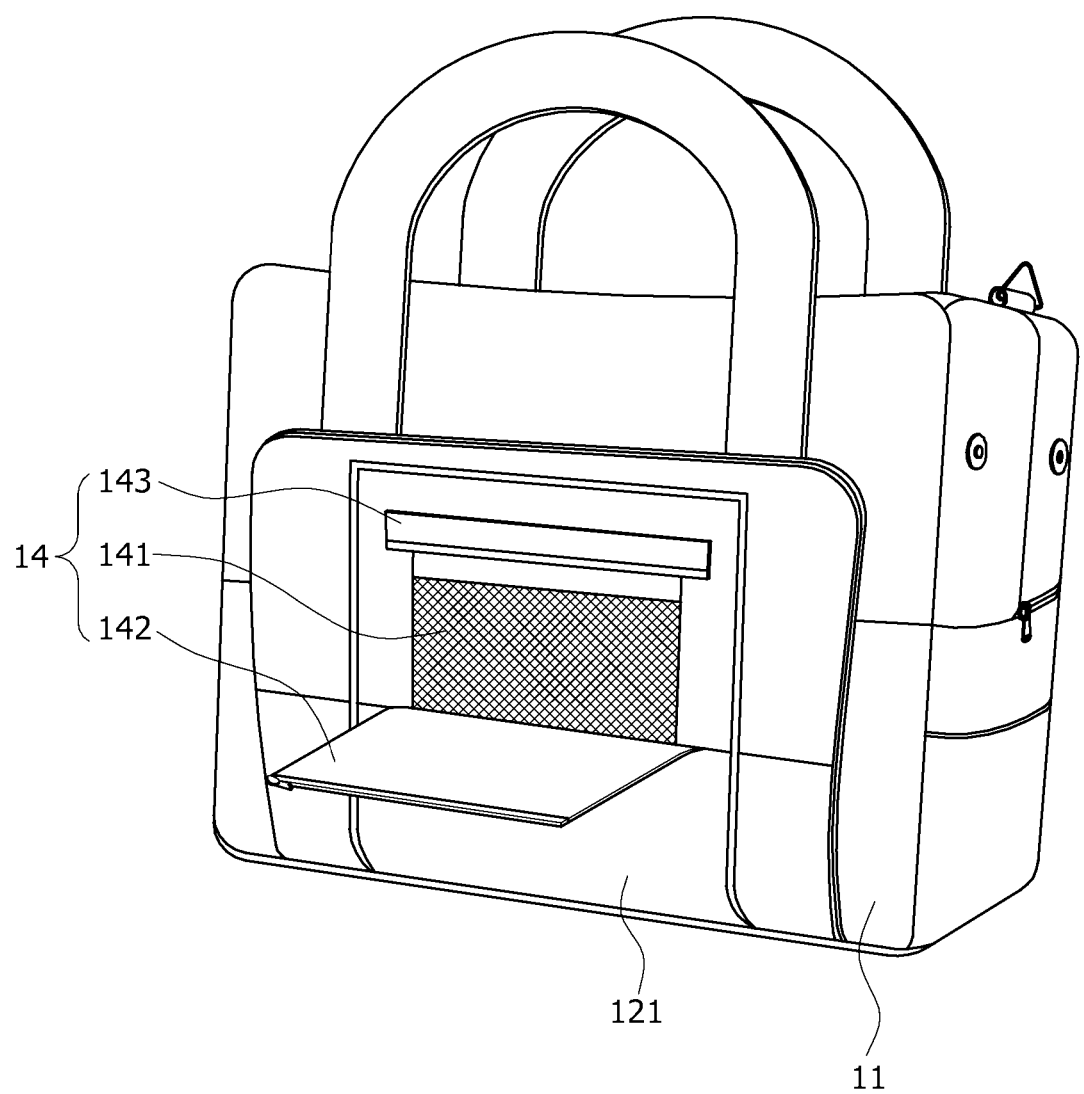
FIG. 5 is a schematic view illustrating a first storage exposure part of the storage apparatus for a companion animal according to one embodiment of the present invention.

FIG. 5 is a schematic view illustrating a first storage exposure part of the storage apparatus for a companion animal according to one embodiment of the present invention. Referring to FIG. 5, the first storage part 10 according to one embodiment of the present invention may further include a first storage exposure part 14. The first storage exposure part 14 is formed in the first storage body part 11 and exposes an interior of the first storage body part 11. Due to the storage exposure part 14, a state in which the companion animal is in the bag may be recognized from the outside.

The first storage exposure part 14 according to one embodiment of the present invention includes an exposure-mesh part 141 and an exposure-opening and closing part 142.

The exposure-mesh part 141 is formed in the first storage body part 11 and has a mesh shape. As an example, the exposure-mesh part 141 may be coupled to the first storage body part 11 and cover a cut region of a portion of the first storage body part 11. More specifically, the exposure-mesh part 141 may be formed in the access door part 121.

The exposure-opening and closing part 142 is formed in the first storage body part 11 and opens or closes the exposure-mesh part 141. As an example, a lower end portion of the opening and closing part 142 may be coupled to the access door part 121 disposed under the exposure-mesh part 141.

An upper end portion of the exposure-opening and closing part 142 may be coupled to the first storage body part 11 so that the exposure-opening and closing part 142 may cover the exposure-mesh part 141. In addition, the upper end portion of the exposure-opening and closing part 142 may be separated from the first storage body part 11 to open the exposure-mesh part 141.

As an example, an exposure-coupling part 143 configured to be coupled or separated in a zipper manner may be formed at the access door part 121 disposed above the exposure-mesh part 141 and the upper end portion of the exposure-opening and closing part 142. In addition, the exposure-opening and closing part 142 and the access door part 121 are detachable or attachable by any one of various manners.

Figure 6:
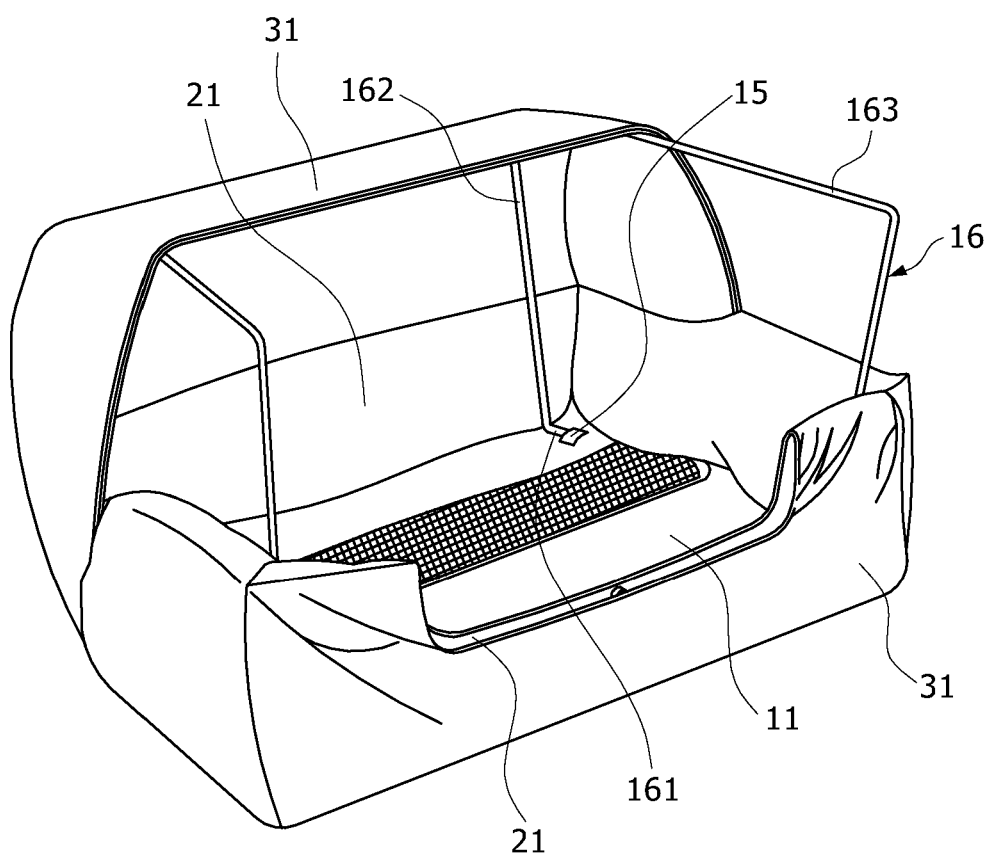
FIG. 6 is a schematic view illustrating a first storage frame part of the storage apparatus for a companion animal according to one embodiment of the present invention.

FIG. 6 is a schematic view illustrating a first storage frame part of the storage apparatus for a companion animal according to one embodiment of the present invention. Referring to FIG. 6, the first storage part 10 according to one embodiment of the present invention includes first storage coupling parts 15 and first storage frame parts 16.

The first storage coupling parts 15 are formed on the first storage body part 11, and the first storage frame parts 16 are rotatably installed on the first storage coupling parts 15. When the storage apparatus 1 is in the house state, the first storage frame part 16 supports the first storage body part 11 in a state in which the first storage frame part 16 lies down, and when the storage apparatus 1 is in the bag state, the first storage frame part 16 supports the third storage part 30 covering the second storage part 20 to suppress deformation of the third storage part 30 in a state in which the first storage frame part 16 stands up.

As an example, a total of four first storage coupling parts 15 is sewn onto each of corner points of the first storage body part 11, and the first storage frame part 16 may include a pair of frame coupling parts 161 inserted into the first storage coupling parts 15 to maintain a coupled state, frame connection parts 162 extending from the frame coupling parts 161, and a frame support part 163 which connects the frame connection parts 162 and supports the third storage part 30.

Figure 7:
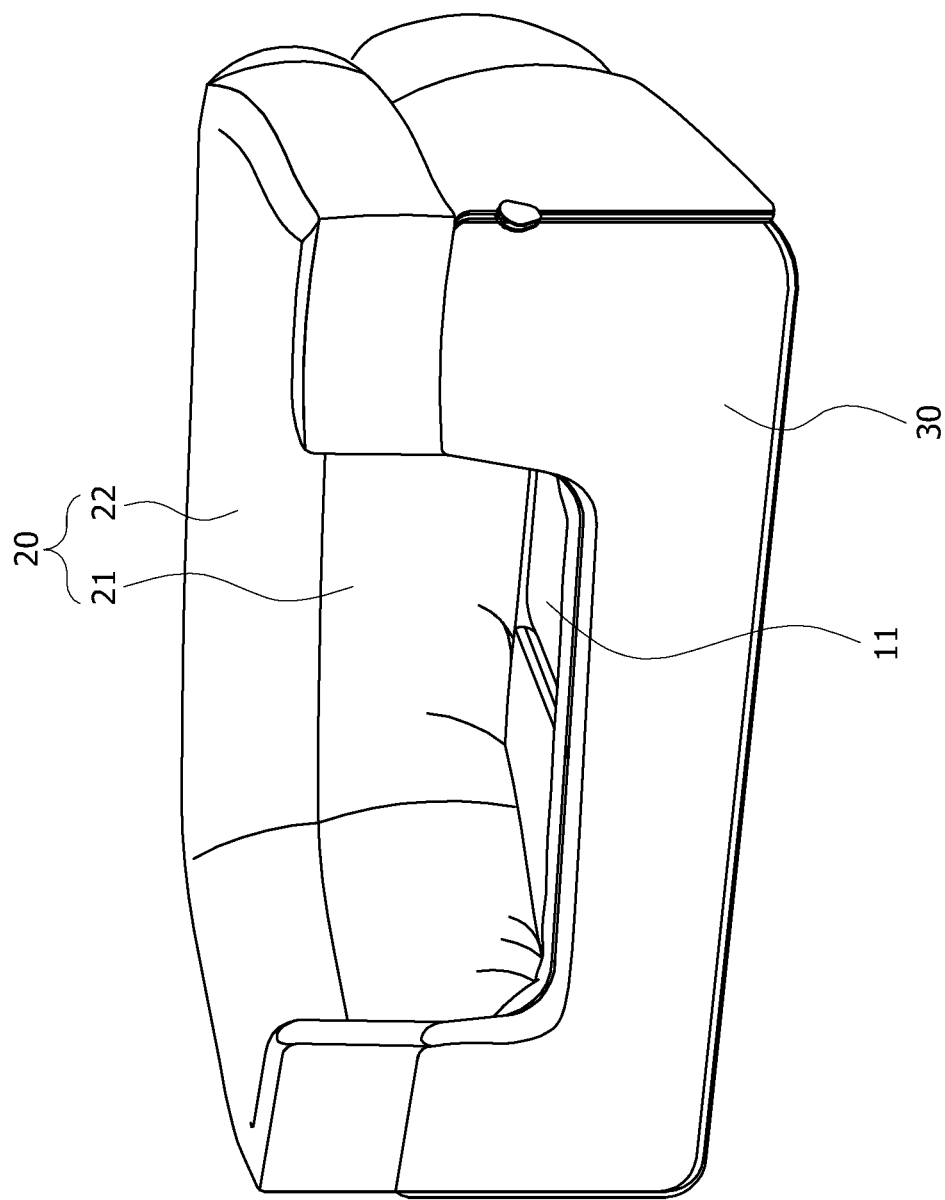
FIG. 7 is a schematic view illustrating a second storage part of the storage apparatus for a companion animal according to one embodiment of the present invention.

FIG. 7 is a schematic view illustrating a second storage part of the storage apparatus for a companion animal according to one embodiment of the present invention. Referring to FIG. 7, the second storage part 20 according to one embodiment of the present invention includes a second storage protrusion part 21.

The second storage protrusion part 21 protrudes upward from the edge of the first storage part 10, and an upper end portion thereof is connected to the third storage part 30. As an example, when the storage apparatus 1 is in the house state and the companion animal is seated on the first storage body part 11, the second storage protrusion part 21 protruding from an edge of the first storage body part 11 may function as a fence to protect the companion animal. In this case, the upper end portion of the second storage protrusion part 21 is made of a deformable material to which the third storage part 30 is connected so that third storage part 30 may be turned over. When the storage apparatus 1 is in the house state, the third storage part 30 may cover the second storage protrusion part 21 and the first storage body part 11 and, when the storage apparatus 1 is in the bag state, the third storage part 30 may cover an upper side of the second storage protrusion part 21.

The second storage part 20 according to one embodiment of the present invention may further include an additional second storage protrusion part 22. The additional second storage protrusion part 22 extends upward from the second storage protrusion part 21. That is, when the storage apparatus 1 is in the house state, the additional second storage protrusion part 22 may increase a height of the fence, and since the third storage part 30 surrounding only the second storage protrusion part 21 is changed into a bag, a volume of the bag is allowed to be decreased so that portability thereof may be improved.

Figure 8:
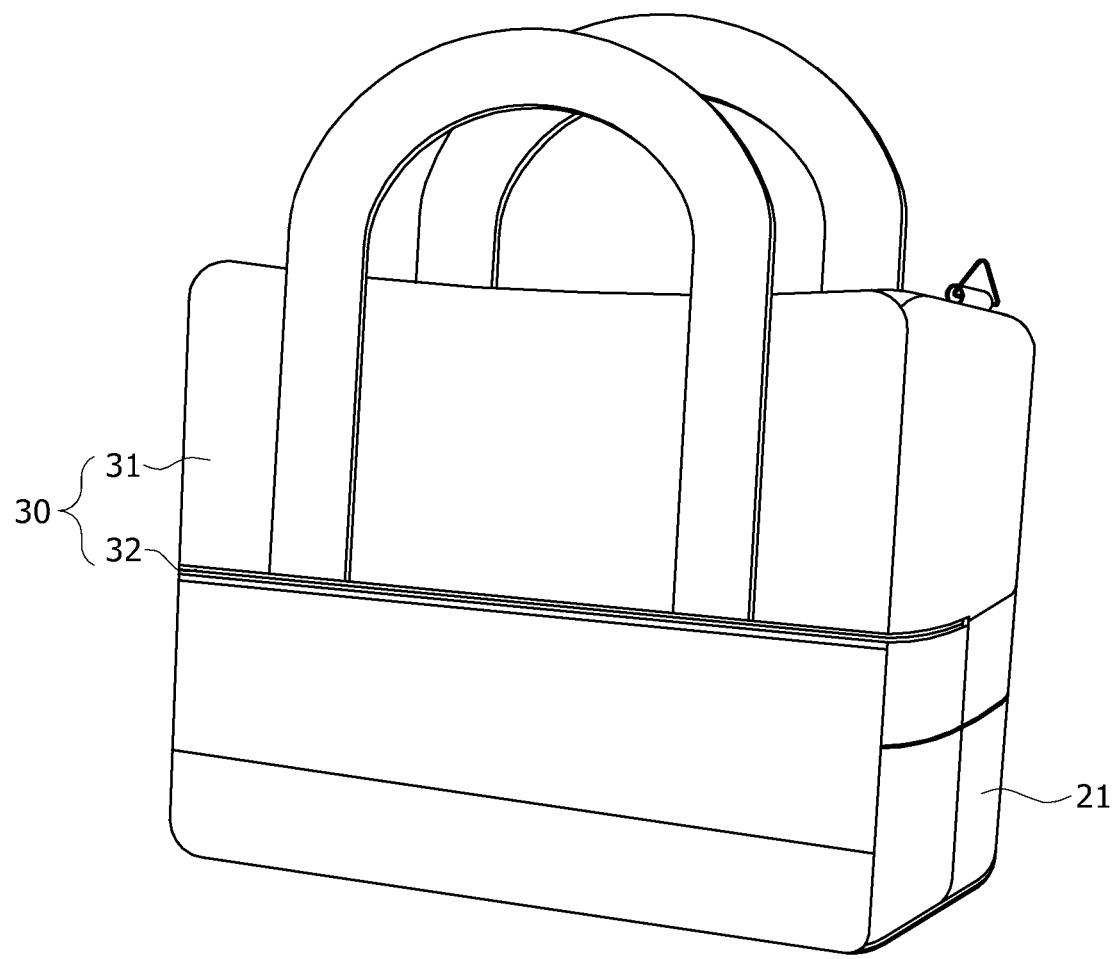
FIG. 8 is a schematic view illustrating a third storage part of the storage apparatus for a companion animal according to one embodiment of the present invention.

FIG. 8 is a schematic view illustrating the third storage part of the storage apparatus for a companion animal according to one embodiment of the present invention. Referring to FIG. 8, the third storage part 30 according to one embodiment of the present invention includes third storage cover parts 31 and a third storage coupling part 32.

A pair of third storage cover parts 31 are coupled to the second storage part 20 and disposed to face each other. As an example, the third storage cover part 31 may be coupled to the second storage protrusion part 21 to surround the second storage protrusion part 21 and the first storage body part 11 or cover the upper side of the second storage protrusion part 21.

The third storage coupling part 32 couples or separates the pair of third storage cover parts 31. As an example, the third storage coupling part 32 may be a zipper which is coupled to or separated from an end portion of the third storage cover part 31. In addition, any one of various components capable of coupling or separating the pair of third storage cover parts 31 may be adopted for the third storage coupling part 32.

Figure 9:
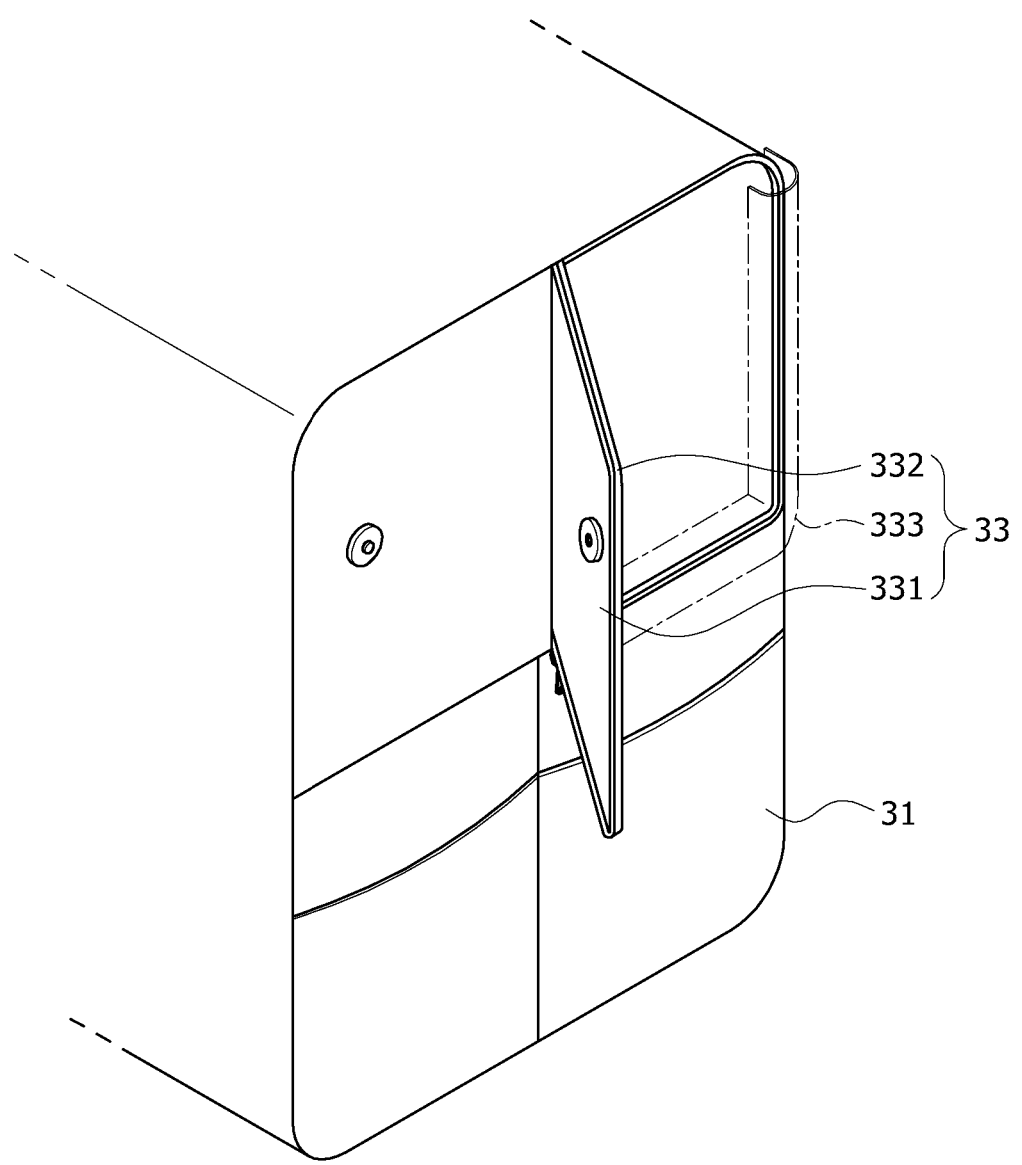
FIG. 9 is a schematic view illustrating a third storage opening and closing part of the storage apparatus for a companion animal according to one embodiment of the present invention.

FIG. 9 is a schematic view illustrating a third storage opening and closing part of the storage apparatus for a companion animal according to one embodiment of the present invention. Referring to FIG. 9, the third storage part 30 according to one embodiment of the present invention may further include a third storage opening and closing part 33.

The third storage opening and closing part 33 is formed in the third storage cover part 31 and opens or closes the third storage cover part 31. As an example, the third storage opening and closing part 33 may include an opening and closing door part 331 and an opening and closing-detachment and attachment part 332. Three sides of the opening and closing door part 331 may be separated from the third storage cover part 31 through a process of cutting the third storage cover part 31, and the opening and closing-detachment and attachment part 332 may connect or separate the opening and closing door part 331 to or from the third storage cover part 31. In this case, a zipper method may be applied to the opening and closing-detachment and attachment part 332, and in addition, any one of various detachable methods may be applied thereto.

The third storage opening and closing part 33 may further include an opening and closing cover part 333. The opening and closing cover part 333 may cover the opening and closing-detachment and attachment part 332 to prevent the companion animal from being injured due to direct contact with the opening and closing-detachment and attachment part 332 when a face of the companion animal sticks out through the opening and closing door part 331. As an example, the opening and closing cover part 333 may be formed of a flexible material, one end portion thereof may be sewn inside the third storage cover part 31, and the other end portion thereof may be detachably attached to an outer side of the third storage cover part 31. In addition, both end portions of the opening and closing cover part 333 may be detachably attached to each of inner and outer sides of the third storage cover part 31.

Figure 10:
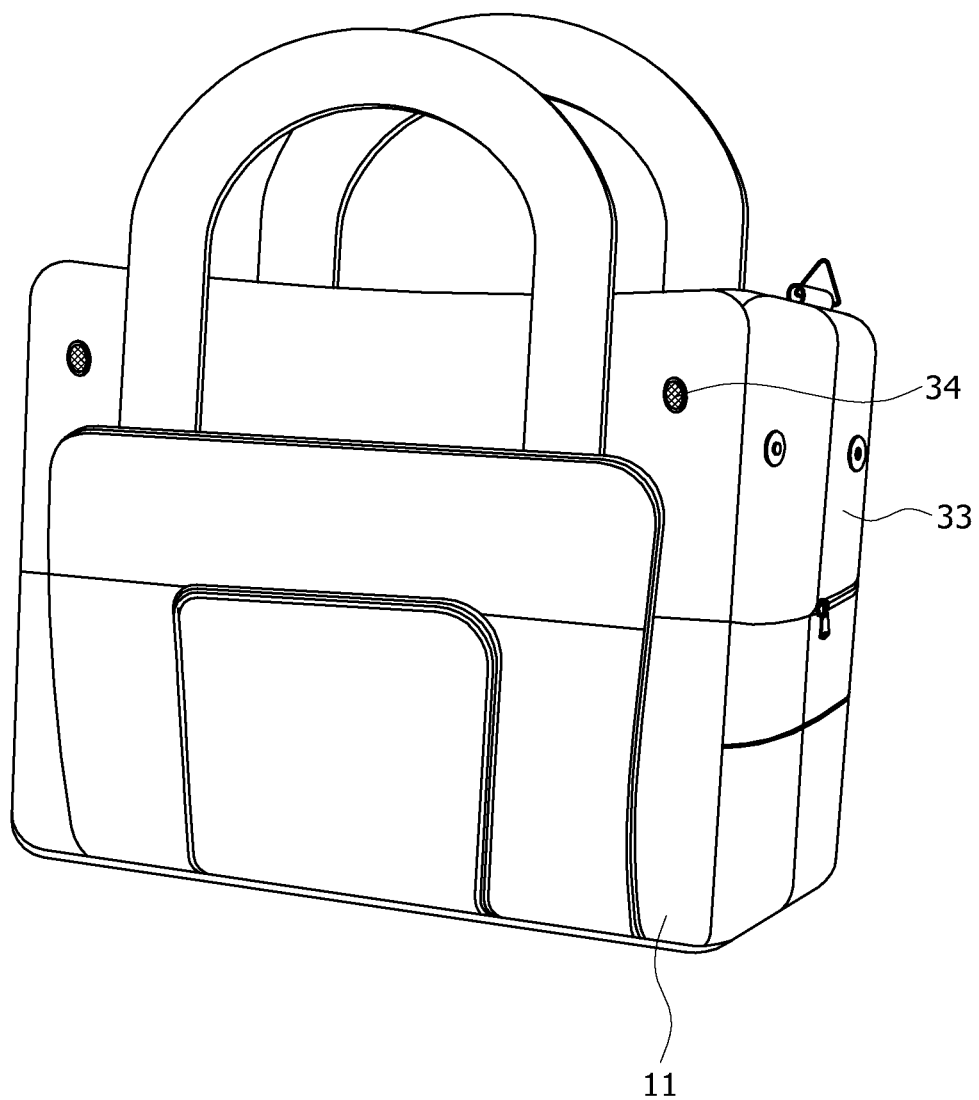
FIG. 10 is a schematic view illustrating a third storage ventilation part of the storage apparatus for a companion animal according to one embodiment of the present invention.

FIG. 10 is a schematic view illustrating a third storage ventilation part of the storage apparatus for a companion animal according to one embodiment of the present invention. Referring to FIG. 10, the third storage part 30 according to one embodiment of the present invention may further include third storage ventilation parts 34.

The third storage ventilation part 34 is formed in the third storage cover part 31, and air flows therethrough. As an example, the third storage ventilation part 34 may be a hole formed in the third storage cover part 31, and the hole may be covered by a mesh so as not to discharge hairs of the companion animal to the outside.

Figure 11:
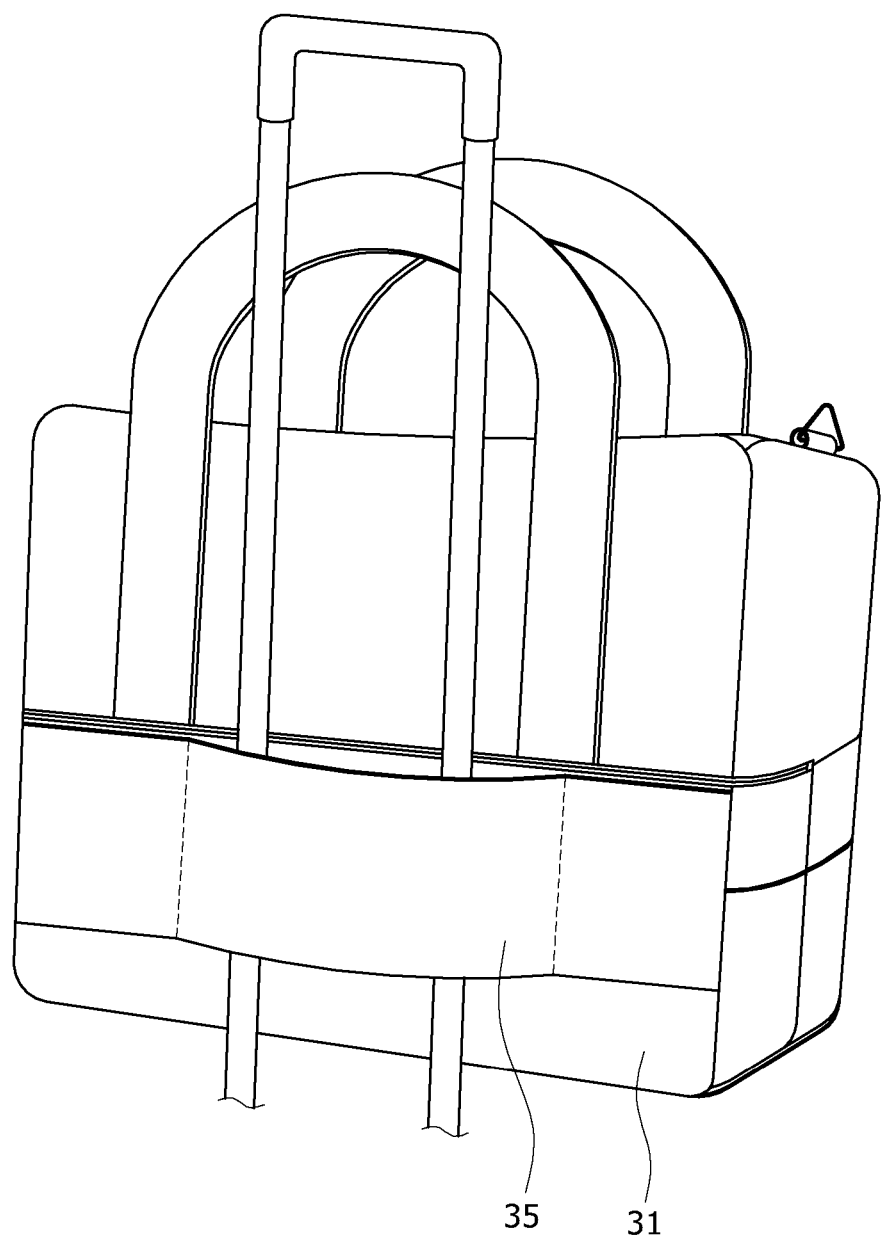
FIG. 11 is a schematic view illustrating a third storage installation part of the storage apparatus for a companion animal according to one embodiment of the present invention.

FIG. 11 is a schematic view illustrating a third storage installation part of the storage apparatus for a companion animal according to one embodiment of the present invention. Referring to FIG. 11, the third storage part 30 according to one embodiment of the present invention may further include a third storage installation part 35.

Figure 12:
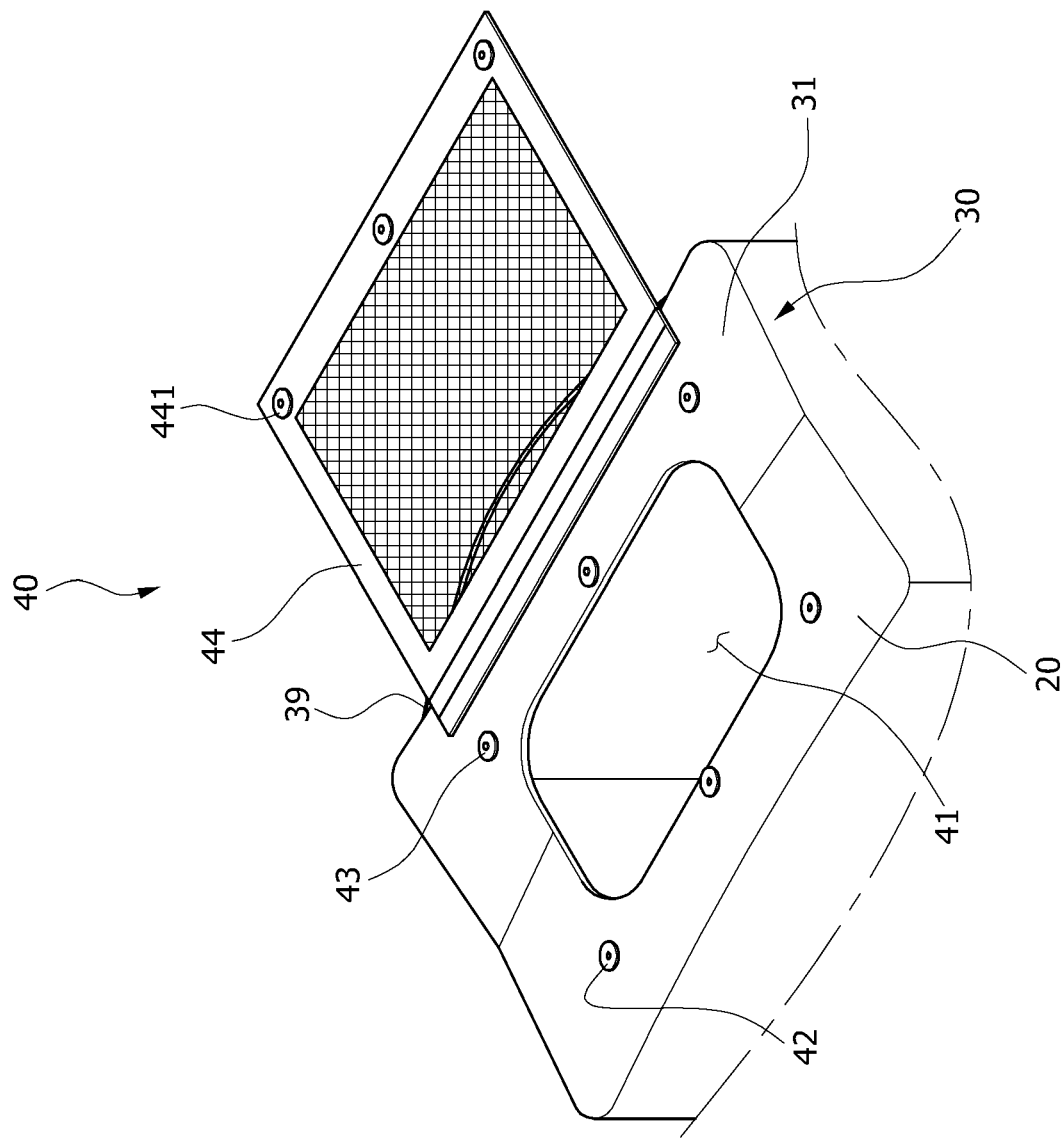
FIG. 12 is a schematic view illustrating a fourth storage part of the storage apparatus for a companion animal according to one embodiment of the present invention.

The third storage installation part 35 is formed on the third storage cover part 31 and installed on a wheel type bag handle. As an example, both end portions of the third storage installation part 35 are fixedly sewn to the third storage cover part 31, a central portion thereof is separated from the third storage cover part 31, and the wheel type bag handle, that is, a carrier handle, passes through a separation gap between the central portion and the third storage cover part 31 so that the storage apparatus 1 for a companion animal having the bag form may be installed around the wheel type bag handle. In addition, the third storage installation part 35 may also be installed outside the second storage part 20. Meanwhile, a vehicle safety belt may pass between the third storage installation part 35 and the third storage cover part 31 and be coupled to a seat to fix the storage apparatus 1 for a companion animal having the bag form. FIG. 12 is a schematic view illustrating a fourth storage part of the storage apparatus for a companion animal according to one embodiment of the present invention. Referring to FIG. 12, the storage apparatus 1 for a companion animal according to one embodiment of the present invention may further include a fourth storage part 40.

The fourth storage part 40 is formed in one or more of the second storage part 20 and the third storage part 30, and an interior thereof is visually recognizable. Accordingly, the user may rapidly recognize a state of the companion animal while moving the storage apparatus 1 for a companion animal, and the companion animal also may recognize its owner and be relieved of anxiety.

The fourth storage part 40 according to one embodiment of the present invention includes fourth storage hole parts 41. The fourth storage hole parts 41 are formed in the second storage part 20 and the third storage part 30. As an example, the fourth storage hole part 41 may have a hole shape cut at a connection point of the second storage part 20 and the third storage part 30. In addition, the fourth storage hole part 41 may be formed to maximize an open area by cutting a portion of the second storage part 20 and a portion of the third storage part 30.

The fourth storage part 40 according to one embodiment of the present invention may further include fourth storage female fixing parts 42, fourth storage male fixing parts 43, and a fourth storage cover part 44.

One or more fourth storage female fixing parts 42 are formed on the second storage part 20 and disposed around the fourth storage hole part 41. One or more fourth storage male fixing parts 43 may be formed on the third storage part 30, disposed around the fourth storage hole parts 41, and coupled to the fourth storage female fixing parts 42. As an example, the fourth storage male fixing part 43 may be inserted into a groove formed in the fourth storage female fixing part 42, and the fourth storage male fixing part 43 and the fourth storage female fixing part 42 may be coupled to each other by a magnetic force or separated from each other by an external force. When the storage apparatus 1 for a companion animal has a house form and the third storage part 30 covers the second storage part 20, the fourth storage male fixing part 43 and the fourth storage female fixing part 42 may be coupled to each other.

The fourth storage cover part 44 is coupled to the third storage part 30, has a mesh shape to be accommodated in the third storage part 30, and is coupled to the fourth storage female fixing part 42 to cover the fourth storage hole part 41. As an example, the fourth storage cover part 44 may be inserted into a third storage insertion part 39 formed outside the third storage body part 31, and when the storage apparatus 1 for a companion animal has the bag form, the fourth storage cover part 44 may be withdrawn from the third storage insertion part 39 to cover the fourth storage hole part 41. Fourth storage cover coupling parts 441 corresponding to fourth storage female fixing parts 42 may be formed on the fourth storage cover part 44.

Figure 13:
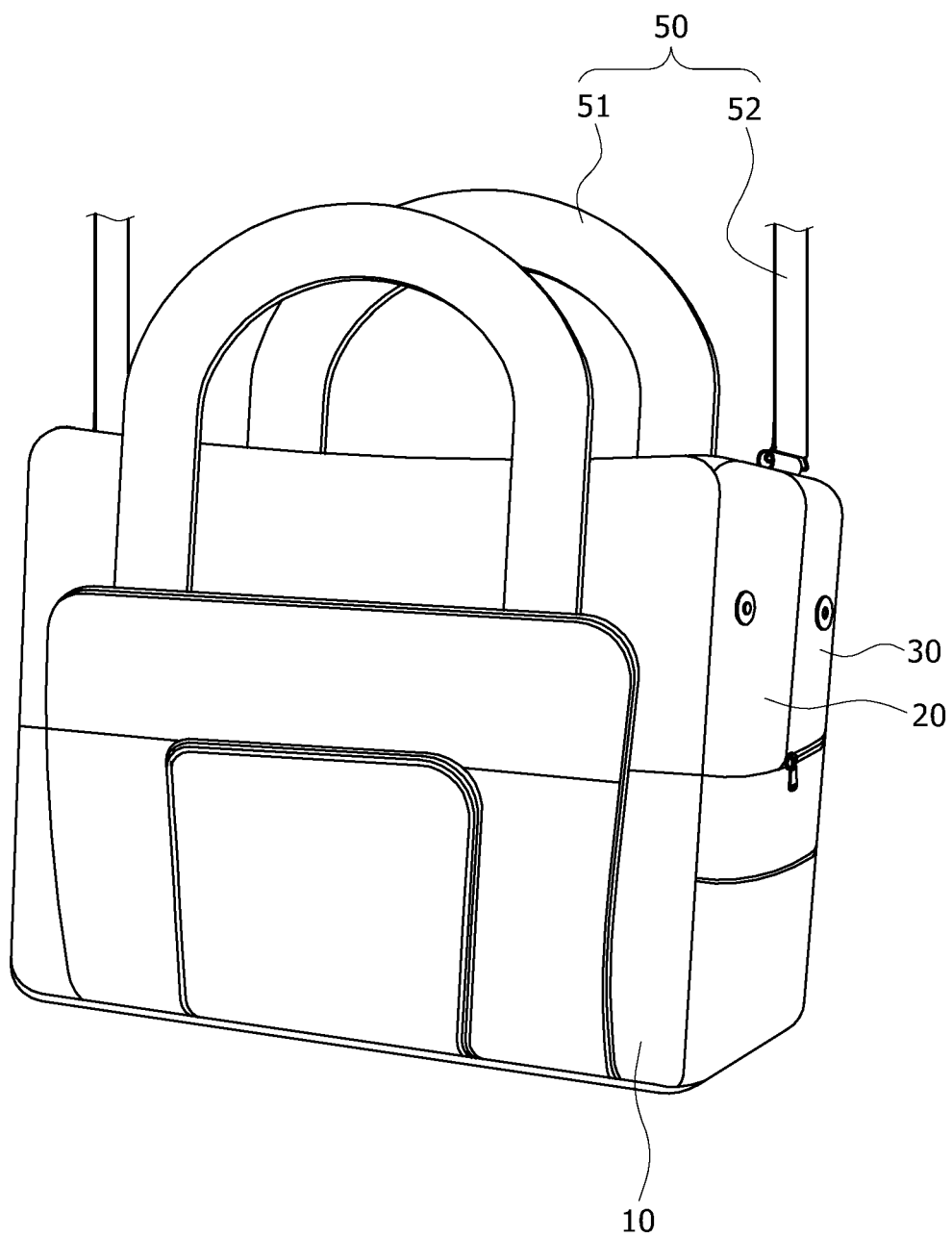
FIG. 13 is a schematic view illustrating a fifth storage part of the storage apparatus for a companion animal according to one embodiment of the present invention.

FIG. 13 is a schematic view illustrating a fifth storage part of the storage apparatus for a companion animal according to one embodiment of the present invention. Referring to FIG. 13, a fifth storage part 50 according to one embodiment of the present invention is formed on one or more of the first to third storage parts 10, 20, and 30 and has a shape so that the user may carry and move the storage apparatus 1.

As an example, the fifth storage part 50 may be formed on each of the first storage part 10 and the third storage part 30 and includes a fifth storage handle part 51 which is graspable by the user. In addition, the fifth storage part 50 may include a fifth storage-shoulder wear part 52 which may be coupled to the second storage part 20 and the third storage part 30 and worn on the shoulder of the user. In this case, since both end portions of a shoulder strap of the fifth storage-shoulder wear part 52 are detachable and attachable, the fifth storage-shoulder wear part may be separately stored when the storage apparatus 1 is in the house state.

Figure 14A:
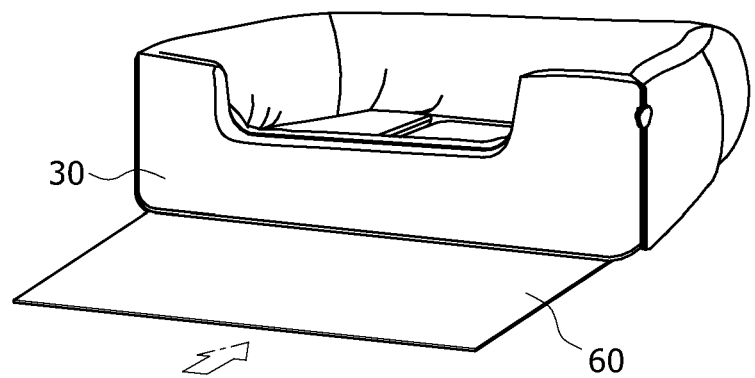
FIG. 14A is a schematic view illustrating a sixth storage part of the storage apparatus for a companion animal according to one embodiment of the present invention.
Figure 14B:
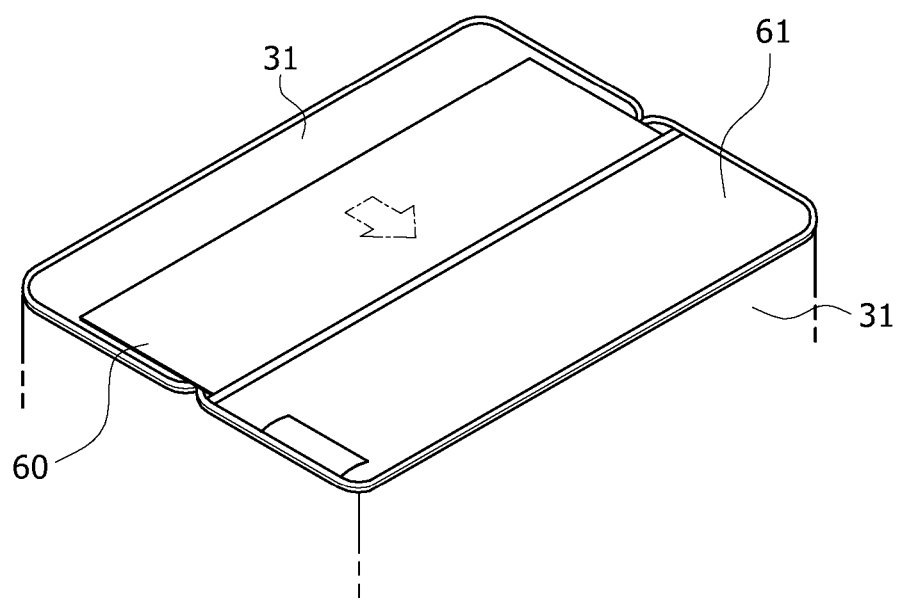
FIG. 14B is a schematic view illustrating a sixth storage part of the storage apparatus for a companion animal according to one embodiment of the present invention.
Figure 14C:
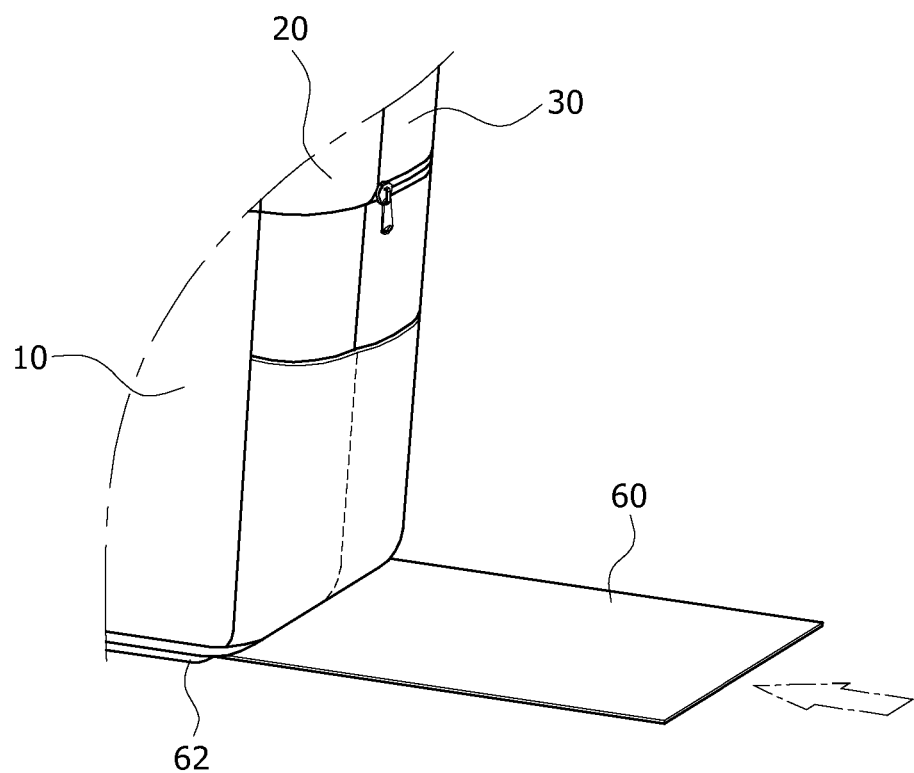
FIG. 14C is a schematic view illustrating a sixth storage part of the storage apparatus for a companion animal according to one embodiment of the present invention.

FIG. 14 is a set of schematic views illustrating a sixth storage part of the storage apparatus for a companion animal according to one embodiment of the present invention. Referring to FIG. 14, sixth storage parts 60 according to one embodiment of the present invention are inserted into one or more of the second storage part 20 and the third storage part 30 to maintain stiffness of one or more of the second storage part 20 and the third storage part 30. As an example, the sixth storage part 60 may be formed of a rectangular plastic material and inserted into the sixth storage insertion part 61 formed in any one of the pair of third storage cover parts 31 forming the bottom surface of the house (see FIGS. 14A and 14B). In addition, the sixth storage parts 60 may be inserted into sixth storage-storing parts 62 formed in the second storage part 20 and the third storage part 30 forming the bottom surface of the bag to suppress deformation of the bag due to a weight of the companion animal (see FIG. 14C). In this case, the sixth storage insertion part 61 and the sixth storage-storing part 62 may have a pouch shape so that the sixth storage parts 60 are inserted thereinto.

Figure 15:
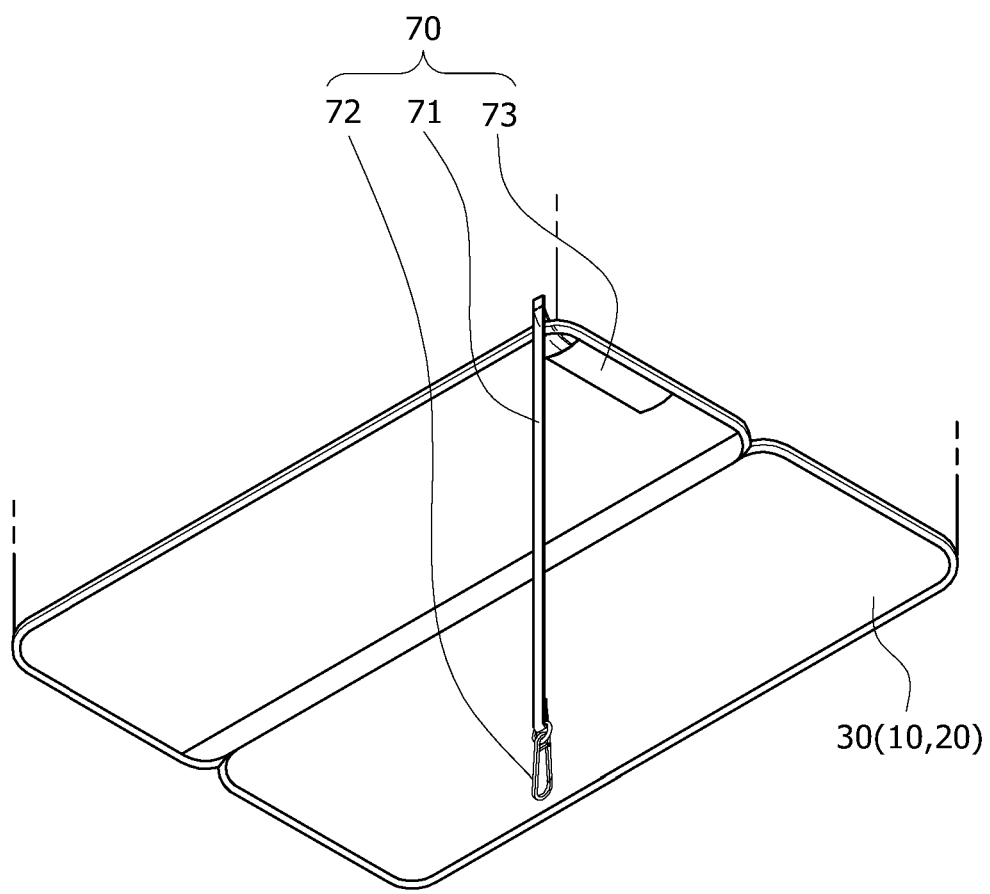
FIG. 15 is a schematic view illustrating a seventh storage part of the storage apparatus for a companion animal according to one embodiment of the present invention.

FIG. 15 is a schematic view illustrating a seventh storage part of the storage apparatus for a companion animal according to one embodiment of the present invention. Referring to FIG. 15, a seventh storage part 70 according to one embodiment of the present invention is coupled to any one of the first storage part 10 to the third storage part 30 and coupled to a collar of the companion animal. As an example, the seventh storage part 70 may include a seventh storage strap part 71 coupled to any one of the first storage part 10 to the third storage part 30 and a corresponding length, and a seventh storage ring part 72 formed at an end portion of the seventh storage strap part 71 and coupled to the collar of the companion animal. In addition, the seventh storage part 70 may further include a seventh storage-storage part 73 which may be coupled to any one of the first storage part 10 to the third storage part 30 and may store the seventh storage strap part 71 having a corresponding length.

Figure 16:
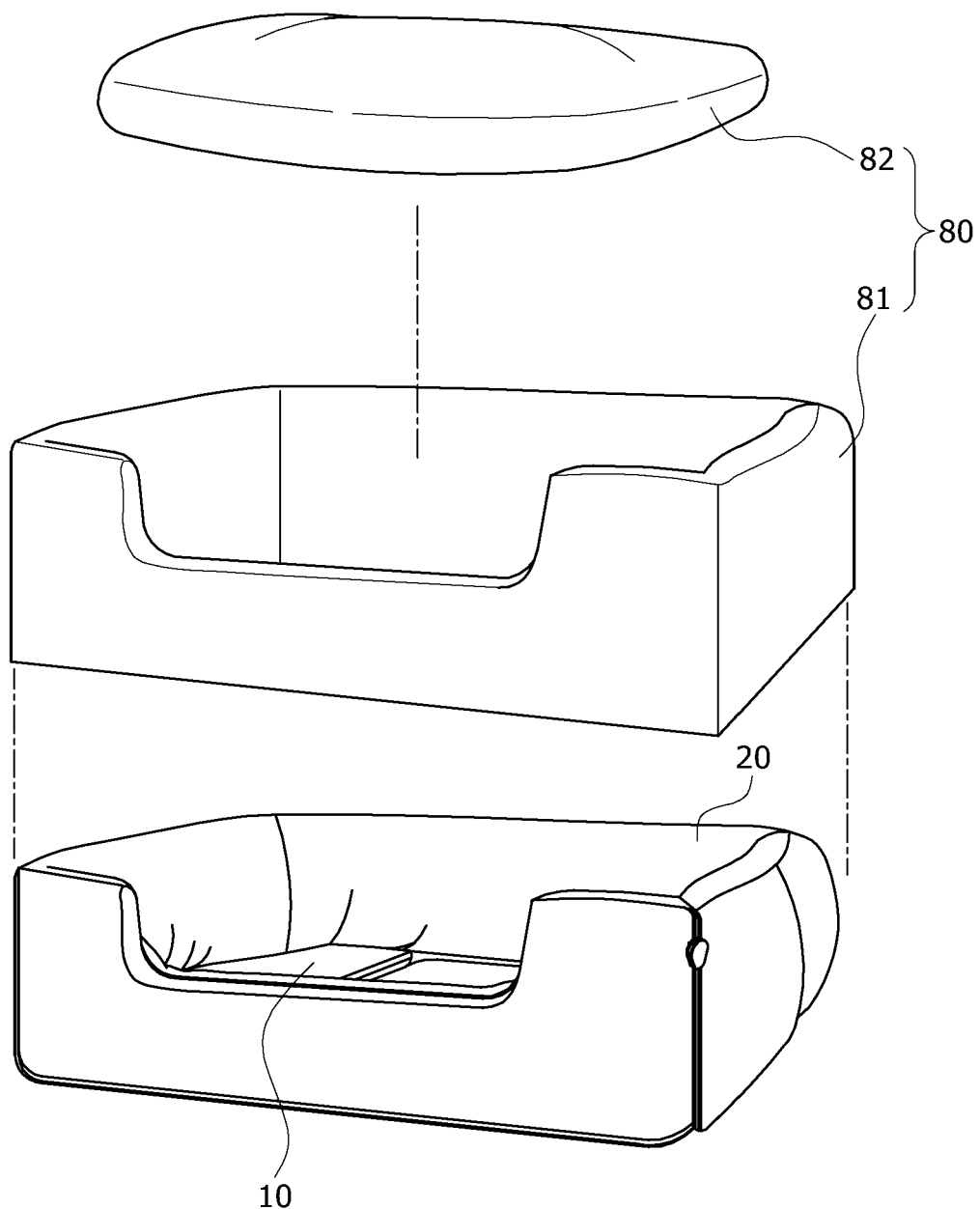
FIG. 16 is a schematic view illustrating an eighth storage part of the storage apparatus for a companion animal according to one embodiment of the present invention.
Figure 17A:
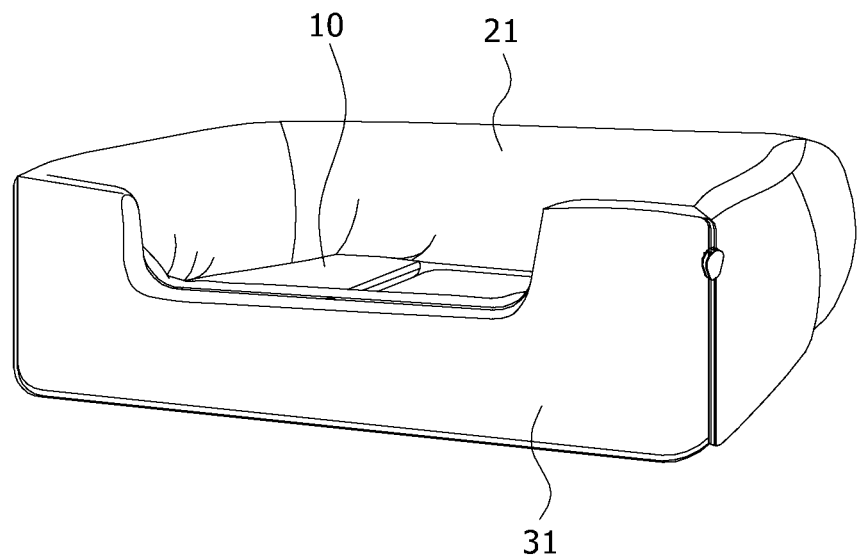
FIG. 17A is a schematic view illustrating a process in which a house state of the storage apparatus for a companion animal according to one embodiment of the present invention is changed into a bag state thereof.
Figure 17B:
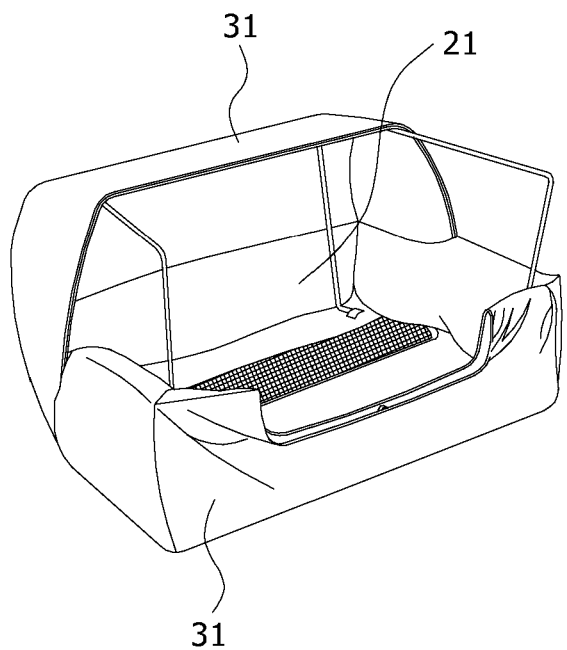
FIG. 17B is a schematic view illustrating a sixth storage part of the storage apparatus for a companion animal according to one embodiment of the present invention.
Figure 17C:
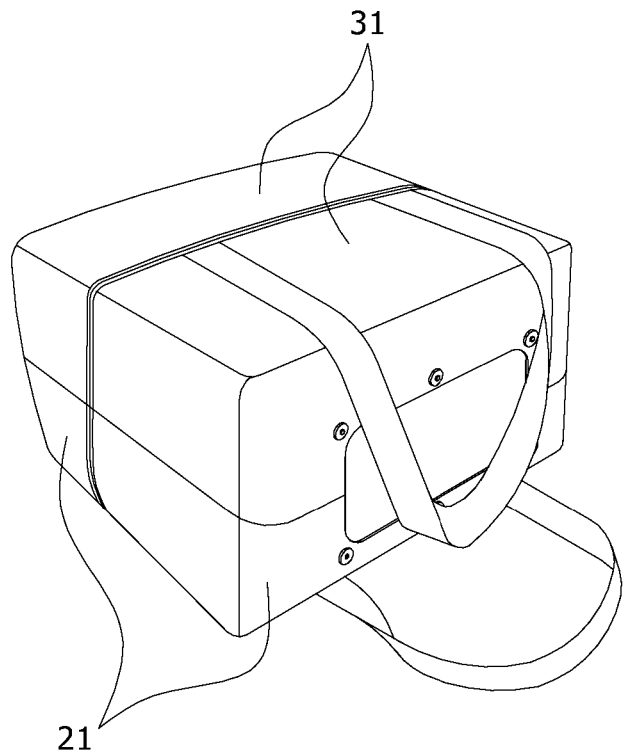
FIG. 17C is a schematic view illustrating a sixth storage part of the storage apparatus for a companion animal according to one embodiment of the present invention.
Figure 17D:
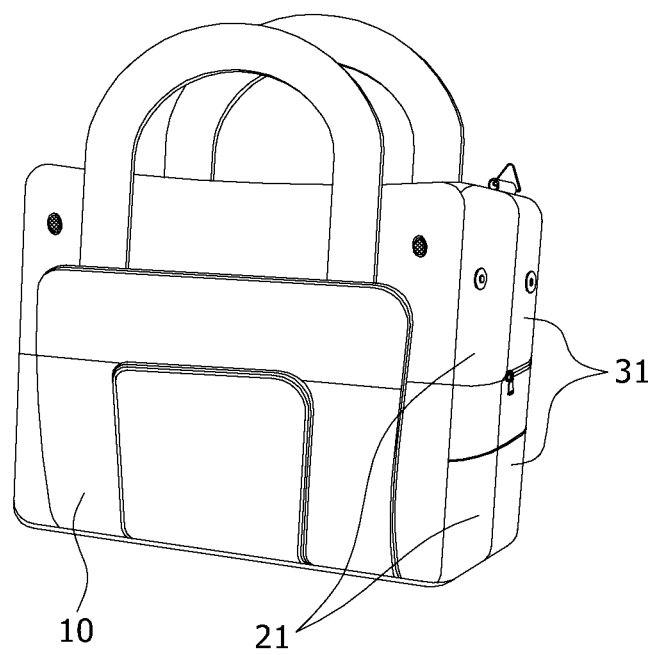
FIG. 17D is a schematic view illustrating a sixth storage part of the storage apparatus for a companion animal according to one embodiment of the present invention.

FIG. 16 is a schematic view illustrating an eighth storage part of the storage apparatus for a companion animal according to one embodiment of the present invention. Referring to FIG. 16, an eighth storage part 80 according to one embodiment of the present invention covers the first storage part 10 and the second storage part 20. In addition, the eighth storage part 80 may cover a portion of the third storage part 30.

As an example, the eighth storage part 80 may include an eighth storage cover part 81 and an eighth storage cushion part 82 surrounding the first storage part 10 and the second storage part 20 when the storage apparatus 1 is in the house state. The eighth storage cover part 81 may be formed of a soft fabric material to provide convenience to the companion animal and may include a waterproof material to prevent contamination due to urine. The eighth storage cushion part 82 may provide cushion to the house. The eighth storage cover part 81 and the eighth storage cushion part 82 may be selectively used, the eighth storage cover part 81 may cover the first storage part 10, the second storage part 20, and a portion of the third storage part 30, and the eighth storage cushion part 82 may cover the eighth storage cover part 81. In addition, when the eighth storage cover part 81 and the eighth storage cushion part 82 are contaminated, the eighth storage cover part 81 and the eighth storage cushion part 82 may be replaced.

FIGS. 17A-D are schematic views illustrating a process in which the house state of the storage apparatus for a companion animal according to one embodiment of the present invention is changed into the bag state thereof. Hereinafter, a method of using the storage apparatus for a companion animal according to one embodiment of the present invention will be described with reference to FIGS. 17A-D.

The second storage part 20 performs a fence function at the edge of the first storage part 10, and the third storage part 30 covers the second storage part 20 and an outer side of the first storage part 10 so that the storage apparatus enters the house state (see FIG. 1).

When the storage apparatus 1 is in the house state, the companion animal may be seated on the first storage part 10 to sleep or rest. In this case, the first storage part 10, the second storage part 20, and the portion of the third storage part 30 may be protected by the separate eighth storage part 80 surrounding the first storage part 10 and the second storage part 20.

In addition, when the user turns the third storage part 30 over so that the third storage part 30 covers the upper side of the second storage part 20, the storage apparatus 1 may enter the bag state, and the companion animal may be moved to the outside (see FIG. 2).

In this case, the bag form may be maintained by rotating the first storage frame parts 16, and the sixth storage parts 60 may be inserted into outer sides of the second storage part 20 and the third storage part 30 to support the weight of the companion animal.

When the storage apparatus enters the bag state, the user separates the first storage access part 12 formed in the first storage body part 11 from the first storage body part 11 to form an entrance for the companion animal and inputs the companion animal through such a space. In addition, the collar of the companion animal is connected to the seventh storage part 70.

When the companion animal enters the storage apparatus 1 for a companion animal in the bag state, the user may carry and move the storage apparatus 1 for a companion animal in the bag state to a destination using the fifth storage part 50.

Meanwhile, the user may visually check a state of the companion animal in the bag through the fourth storage part 40. In addition, a size of the bag may be expanded using the first storage expansion part 13 to provide comfort to the companion animal.

The storage apparatus 1 for a companion animal according to one embodiment of the present invention has the house form when the third storage part 30 surrounds the first storage part 10, and the storage apparatus 1 has the bag form when the third storage part 30 covers the second storage part 20 to store the companion animal.

The companion animal may enter or exit the storage apparatus 1 for a companion animal according to one embodiment of the present invention through the first storage access part 12.

In the storage apparatus 1 for a companion animal according to one embodiment of the present invention, an inner space of the bag may be expanded using the first storage expansion part 13.

In the storage apparatus 1 for a companion animal according to one embodiment of the present invention, the companion animal in the bag may be visually checked through the first storage exposure part 14.

The user may carry and move the storage apparatus 1 for a companion animal according to one embodiment of the present invention using the fifth storage part 50.

In the storage apparatus 1 for a companion animal according to one embodiment of the present invention, the sixth storage parts 60 may be inserted into one or more of the second storage part 20 and the third storage part 30 and support the weight of the companion animal when the storage apparatus 1 is in the house or bag state.

In the storage apparatus 1 for a companion animal according to one embodiment of the present invention, the eighth storage part 80 may cover the first storage part 10, the second storage part 20, and the portion of the third storage part 30 to reduce contamination of the first storage part 10 and the second storage part 20.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A storage apparatus for a companion animal, comprising:
   a first storage part in which a companion animal is seated;
   a second storage part connected to an edge of the first storage part and configured to surround the companion animal; and
   a third storage part coupled to the second storage part,
   wherein the third storage part surrounds the first storage part or is turned over to cover an upper side of the second storage part;
   wherein the storage apparatus further comprising a fourth storage part formed in one or more of the second storage part and the third storage part and allowing an interior to be visually recognized.

2. The storage apparatus of claim 1, wherein the first storage part includes:
   a first storage body part; and
   a first storage access part formed in the first storage body part and configured to open the first storage body part to allow the companion animal to enter or exit therethrough.

3. The storage apparatus of claim 2, wherein the first storage access part includes:
   an access door part separated from the first storage body part by cutting a portion of the first storage body part; and
   an access-detachment and attachment part which connects or separates the access door part to or from the first storage body part.

4. The storage apparatus of claim 2, wherein the first storage part further includes a first storage expansion part formed in the first storage body part to expand a space.

5. The storage apparatus of claim 2, wherein the first storage expansion part includes:
   an expansion-door part separated from the first storage body part by cutting a portion of the first storage body part;
   an expansion-detachment and attachment part connecting or separating the expansion-door part to or from the first storage body part; and
   an expansion-mesh part which connects the expansion-door part and the first storage body part and is folded or unfolded.

6. The storage apparatus of claim 2, wherein the first storage part further includes a first storage exposure part formed in the first storage body part and exposing an interior of the first storage body part.

7. The storage apparatus of claim 6, wherein the first storage exposure part includes:
   an exposure-mesh part formed in the first storage body part and having a mesh shape; and
   an exposure-opening and closing part formed in the first storage body part to open or close the exposure-mesh part.

8. The storage apparatus of claim 2, wherein the first storage part further includes:
   a first storage coupling part formed on the first storage body part; and
   a first storage frame part rotatably installed in the first storage coupling part and configured to support the first storage body part or the third storage part covering the upper side of the second storage part.

9. The storage apparatus of claim 1, wherein the second storage part includes a second storage protrusion part protruding upward from the edge of the first storage part and having an upper end portion connected to the third storage part.

10. The storage apparatus of claim 9, wherein the second storage part further includes an additional second storage protrusion part extending upward from the second storage protrusion part.

11. The storage apparatus of claim 1, wherein the third storage part includes:
   a pair of third storage cover parts coupled to the second storage part and facing each other; and
   a third storage coupling part which couples or separates the pair of third storage cover parts.

12. The storage apparatus of claim 11, wherein the third storage part further includes a third storage opening and closing part formed in the third storage cover part to open or close the third storage cover part.

13. The storage apparatus of claim 11, wherein the third storage part further includes one or more third storage ventilation parts which are formed in the third storage cover part and through which air passes.

14. The storage apparatus of claim 11, wherein the third storage part further includes a third storage installation part formed on the third storage cover part and installed on a wheel type bag handle.

15. The storage apparatus of claim 1, wherein the fourth storage part includes a fourth storage hole part formed in the second storage part and the third storage part.

16. The storage apparatus of claim 15, wherein the fourth storage part further includes:
   one or more fourth storage female fixing parts formed on the second storage part and disposed around the fourth storage hole part;
   one or more fourth storage male fixing parts formed on the third storage part and disposed around the fourth storage hole part to be coupled to the fourth storage female fixing parts; and
   a fourth storage cover part coupled to the third storage part, having a mesh shape to be accommodated in the third storage part, and coupled to the fourth storage female fixing part to cover the fourth storage hole part.

17. The storage apparatus of claim 1, further comprising a fifth storage part formed on one or more of the second storage part and the third storage part and allowing a user to carry and move the storage apparatus.

18. The storage apparatus of claim 1, further comprising a sixth storage part inserted into one or more of the second storage part and the third storage part to maintain stiffness thereof.

19. The storage apparatus of claim 1, further comprising a seventh storage part coupled to the third storage part and a collar of the companion animal.

20. The storage apparatus of claim 1, further comprising an eighth storage part covering the first storage part and the second storage part.

* * * * *